J. M. KISSEL.
AUTOMOBILE FENDER.
APPLICATION FILED NOV. 21, 1914.
1,155,933.
Patented Oct. 5, 1915.
2 SHEETS—SHEET 1.
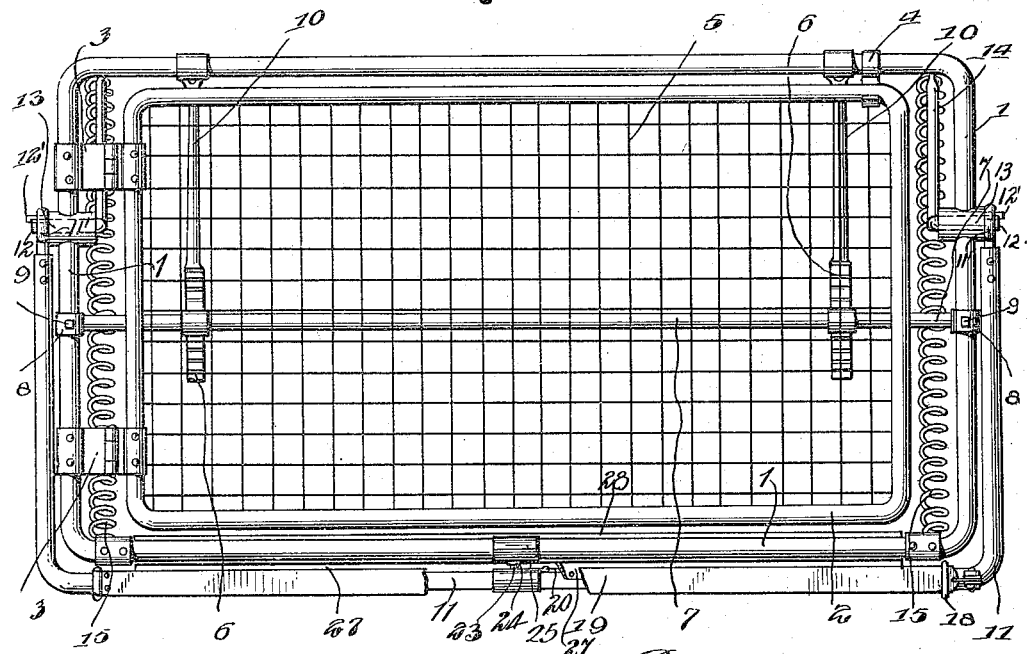
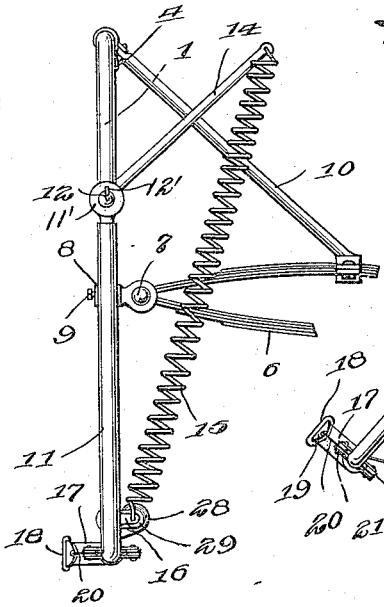
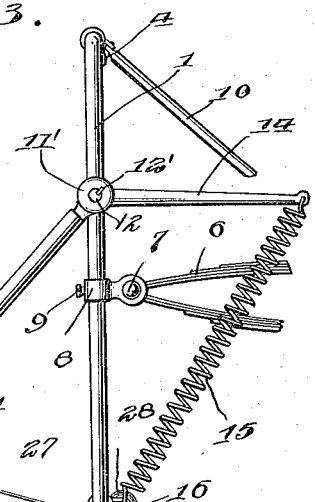
Inventor
John M. Kissel.
Witnesses
Frederick L. Fox.
P. M. Smith.
By Victor J. Evans.
Attorney

J. M. KISSEL.
AUTOMOBILE FENDER.
APPLICATION FILED NOV. 21, 1914.

1,155,933.

Patented Oct. 5, 1915.
2 SHEETS—SHEET 2.

Inventor
John M. Kissel.

Witnesses
Frederick L. Fox.
P. M. Smith.

By Victor J. Evans.
Attorney

UNITED STATES PATENT OFFICE.

JOHN M. KISSEL, OF EAST ST. LOUIS, ILLINOIS.

AUTOMOBILE-FENDER.

1,155,933.   Specification of Letters Patent.   Patented Oct. 5, 1915.

Application filed November 21, 1914. Serial No. 873,361.

*To all whom it may concern:*

Be it known that I, JOHN M. KISSEL, a citizen of the United States, residing at East St. Louis, in the county of St. Clair and State of Illinois, have invented new and useful Improvements in Automobile-Fenders, of which the following is a specification.

This invention relates to fenders particularly designed for use on automobiles and other motor cars, the object of the invention being to produce a fender which may be easily mounted on the standard motor car at the front thereof, which fender is adjustable up and down to suit the operator and to give the proper road clearance, said fender embodying in connection with a fixed frame, a jointed and swinging frame combined with a flexible apron, and automatic tripping means whereby, when the fender comes in contact with a person or object, the apron is automatically spread out so as to catch and hold such person or object, thereby preventing the same from getting under the wheels and chassis of the machine.

With the above and other objects in view, the invention consists in the novel construction, combination and arrangement of parts, as herein described, illustrated and claimed.

Figure 4:
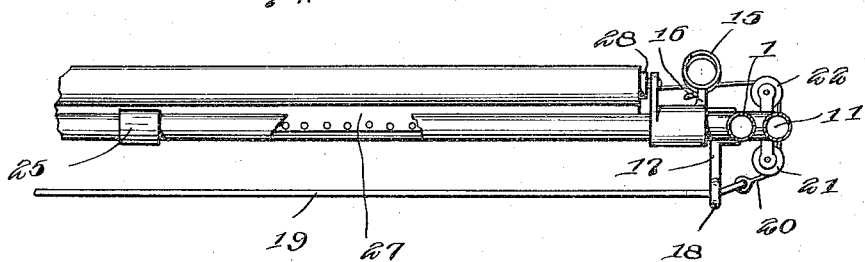
Figure 5:
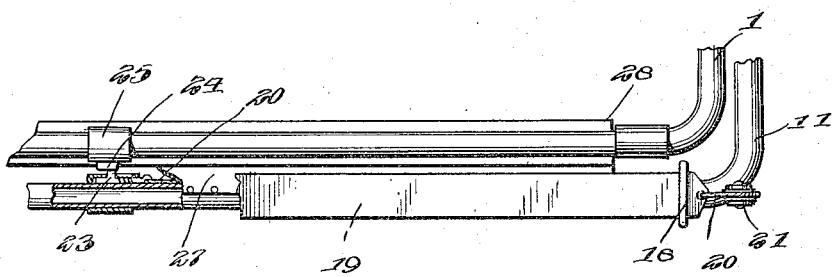
Figure 7:
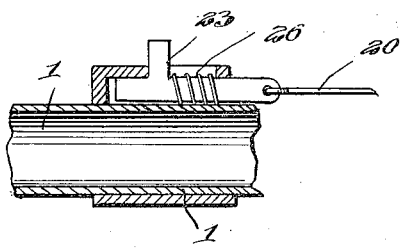
Figure 6:
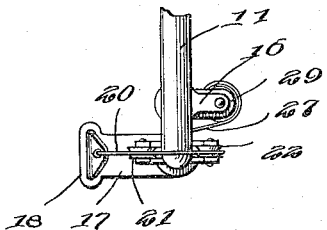

In the accompanying drawings:—Figure 1 is a front elevation of the fender of this invention. Fig. 2 is a side elevation of the same showing the parts in their normal position. Fig. 3 is a view similar to Fig. 2 showing the position of the parts after the apron spreading frame has been tripped and thrown to its catching position. Fig. 4 is a horizontal section through the bottom portion of the fender showing the automatic tripping means. Fig. 5 is a section taken at right angles to Fig. 4. Fig. 6 is an end elevation of the parts shown in Figs. 4 and 5. Fig. 7 is a fragmentary section, showing the spring thrust latch bolt and adjacent parts.

Referring to the drawings 1 designates a stationary frame which, in the preferred embodiment of this invention, is of rectangular shape and constructed of tubing, thereby imparting strength and lightness thereto.

Within the stationary marginal frame 1 is another normally stationary frame 2 which constitutes a movable section of the frame 1, the frame 2 being connected by hinges 3 to one of the side bars of the frame 1, as shown in Fig. 1, and being connected at another point to the frame 1 by means of a latch 4, which normally holds the frames 1 and 2 in fixed relation to and in alinement with each other. By means of the latch 4, however, the frame 2 may be swung outwardly on the hinges 3 to allow the machine to be started with the usual hand crank. In case a self-starter is used, it will not be necessary, of course, to swing the frame 2 outwardly as described. The frame 2 is covered with any suitable flexible fabric 5, such as meshed wire, to cushion the impact against the person or object and prevent injury to persons struck by the fender.

The frame 1 is supported by the forward ends of the springs 6 of the machine, said ends of the springs being connected by a cross bar or rod 7, from which extend forwardly a pair of supporting brackets 8 in the form of sleeves which are bored vertically to receive the side bars of the frame 1. Set screws 9 are inserted through the brackets or sleeves 8 and bear against the side bars of the frame 1, thereby providing for the vertical adjustment of said frame 1 in order to adapt the fender to any particular motor car. Braces 10 are interposed between the top bar of the frame 1 and the springs 6 or frame of the motor car so as hold the frame 1 in an approximately vertical position.

11 designates a bail-shaped swinging frame having at the upper extremities of the side arms thereof eyes 11' fastened by keys 12' to shafts 12 which are journaled in bearings 13 on the side bars of the frame 1, said shafts 12 being provided at their inner ends with upwardly and rearwardly extending arms 14. From the extremities of the arms 14, contractile springs 15 extend to the bottom of the fender frame 1 where they connect with ears or lugs 16 on said frame. Extending forwardly from the bottom bar of the swinging frame 11 are brackets or arms 17 provided with eyes 18 at their forward extremities. A flexible strap 19 is fastened at one end to one of said brackets and passes through the eye 18 at the opposite side of the fender frame where it has connected thereto a flexible cable 20. This cable passes around guiding sheaves 21 and 22 and then inwardly to the strap 19 where it is attached at its extremity to a spring thrust latch bolt 23. This bolt 23 engages a keeper 24 projecting from the bottom bar of the frame 1 and entering a socket formed in a collar 25 on the bottom bar of the frame 11. When the bolt 23 is urged inwardly by the spring surrounding the same and indicated at 26, the frame 11 is locked to the frame 1 and lies in alinement therewith as shown in Fig. 2. When an object strikes the flexible strap 19, the pin 23 is withdrawn and thereupon the springs 15 throw the bottom of the frame 11 in a forward direction spreading the apron to be now described.

27 designates a flexible apron of canvas, netting or any suitable material. This apron is attached along one edge to the bottom bar of the frame 11 and the remainder of said apron is wound upon a spring roller 28 which is journaled in arms or extensions 29 on the bottom bar of the frame 1. When the frame 11 is thrown forwardly by the action of the springs 15, said apron is unwound from its roller 28, thereby forming a basket or scoop in which to catch and hold a person or object struck by the fender.

It will be understood that the frames 1, 2 and 11 are all normally in a common plane and substantially in vertical alinement with each other, as shown in Fig. 2. It will also be understood that the fender as a whole may be adjusted vertically to provide any desired amount of road clearance. When the fender strikes a person or object, the first contact is with the flexible strap 19, which operates to quickly trip the frame 11 and spread the apron 27 so as to catch and hold the person and object until the machine may be brought to a standstill. The frame 11 may be easily reset by pressing the same inwardly and reëngaging the latch pin 23 with the keeper 24. The hinged frame 2 provides for cranking any machine not equipped with a self-starter.

What I claim is:—

1. A fender comprising in combination, a support, a stationary substantially upright marginal frame, a frame hinged to said stationary frame and provided with flexible fabric, an apron spreading frame having a jointed connection with said stationary frame, a flexible apron connecting the free end of said spreading frame with the stationary frame, spring mechanism for actuating said spreading frame to spread said apron, and a latch for holding said spreading frame in an inoperative position.

2. A fender comprising in combination, a support, a stationary substantially upright marginal frame, means for adjusting said frame up and down, a frame hinged to said stationary frame and provided with flexible fabric, an apron spreading frame having a jointed connection with said stationary frame, a flexible apron connecting the free end of said spreading frame with the stationary frame, spring mechanism for actuating said spreading frame to spread said apron, and a latch for holding said spreading frame in an inoperative position.

3. A fender comprising in combination, a support, a stationary substantially upright marginal frame, a frame hinged to said stationary frame and provided with flexible fabric, an apron spreading frame having a jointed connection with said stationary frame, a flexible apron connecting the free end of said spreading frame with the stationary frame, a spring roller on which said apron is wound, spring mechanism for actuating said spreading frame to spread said apron, and a latch for holding said spreading frame in an inoperative position.

4. A fender comprising in combination, a support, a stationary substantially upright marginal frame, a frame hinged to said stationary frame and provided with flexible fabric, an apron spreading frame having a jointed connection with said stationary frame, a flexible apron connecting the free end of said spreading frame with the stationary frame, spring mechanism for actuating said spreading frame to spread said apron, a latch for holding said spreading frame in an inoperative position, and means actuated by contact for tripping said latch.

5. A fender comprising in combination, a support, a stationary substantially upright marginal frame, a frame hinged to said stationary frame and provided with flexible fabric, an apron spreading frame having a jointed connection with said stationary frame, a flexible apron connecting the free end of said spreading frame with the stationary frame, spring mechanism for actuating said spreading frame to spread said apron, a latch for holding said spreading frame in an inoperative position, a flexible strap extending in front of the fender and substantially parallel thereto, and means connected with said strap for tripping said apron spreading frame.

In testimony whereof I affix my signature in presence of two witnesses.

JOHN M. KISSEL.

Witnesses:
T. F. MARTEN,
Mrs. BRIDGIE GRIFFIN.